March 7, 1950 S. C. HURLEY, JR 2,499,921

AMPLIFYING CIRCUIT

Filed Jan. 4, 1947

INVENTOR.
SAMUEL C. HURLEY, JR.
BY Benedict & Swartwood
ATTORNEYS

Patented Mar. 7, 1950

2,499,921

UNITED STATES PATENT OFFICE 2,499,921

AMPLIFYING CIRCUIT

Samuel C. Hurley, Jr., Danville, Ill.; Wilmina L. Hurley, executrix of said Samuel C. Hurley, Jr., deceased, assignor to Wilmina L. Hurley, Danville, Ill.

Application January 4, 1947, Serial No. 720,227

6 Claims. (Cl. 250—214)

Figures 1, 2:
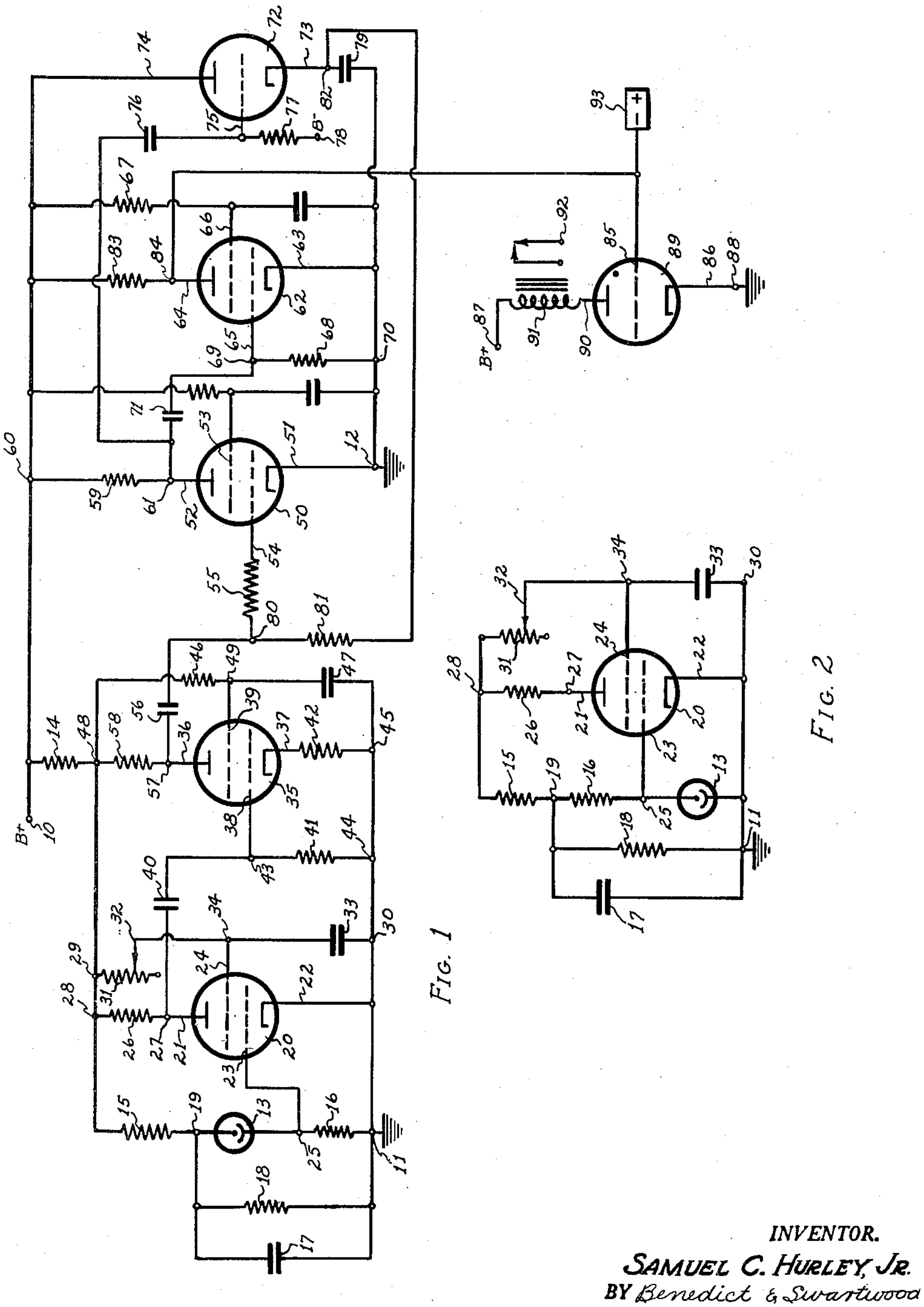

This invention relates to an improved amplifying circuit and particularly to a photoelectric amplifying circuit in which the circuit is responsive only to a change in the amount of light received by a photoelectric device when such change in light varies from a predetermined standard amount of light.

My circuit is particularly useful in registration control devices. In the registration control devices of colored printing operations, the paper is white and the printing rolls place certain colored indicia marks on the paper which are darker than the white background of the paper. A photoelectric device or scanner scans the paper and when a darker mark appears before it, the scanner responds to indicate whether or not the printing presses are in registration. With my device the amplifying circuit is only responsive when a dark mark appears and is not responsive for increases in light over the amount which would normally be received by the phototube in scanning the light background of the paper. However my invention is in the amplifying circuit and not in the use of the circuit.

My device could be used as a burglar alarm such that when a person passes between the phototube and the light, the circuit would cause an alarm to ring.

My circuit is applicable wherever it is desired to have the circuit responsive to a sudden change in light in one direction from a predetermined standard amount of light.

It is therefore an object of my invention to provide an improved amplifying circuit which is responsive to a change of light only in one direction from a predetermined standard amount of light.

It is also an object of the invention to provide an amplifying circuit which is responsive only to a negative pulse of potential and not to a positive pulse.

It is a further object of this invention to provide an automatic volume control to average out the strength of a plurality of pulses received by the first amplifying tube of the circuit.

A further object of the invention is to provide an amplifying circuit which is highly sensitive to the pulse it is designed to receive and is highly insensitive to extraneous or outside undesirable pulses.

Other advantages, uses and objects of my invention will become apparent by referring to the drawings in which Figure 1 illustrates the amplifying circuit employing a phototube in which the circuit is responsive only to a decrease in the amount of light received by the phototube from a standard amount of light.

Figure 2 is a modification of Figure 1 and particularly it is a modification of the light sensitive circuit employing the phototube whereby the circuit is responsive to sudden increases in light over and above a predetermined standard amount of light. However in both Figures 1 and 2, the circuit is only responsive to a negative pulse of potential received by the control grid in the first amplifying tube. The circuit is unresponsive to positive pulses received as will be hereinafter explained.

Referring to Figure 1 a direct current source of potential is used having its positive terminal at 10 and grounded at points 11 and 12. The entire circuit is therefore connected to one common source of direct current potential although separate sources could be used. A phototube 13 is provided for imparting voltage changes to the circuit. While this circuit is particularly useful in connection with photoelectric inspection operations and while a photoelectric control of the circuit is preferable, it is understood that this circuit may be used wherever it is desired to have a circuit responsive to a negative pulse in potential and other means than a change in light received by a phototube may be used to impart the negative pulse.

The phototube 13 is embodied in a series circuit comprising dividing resistors 14, 15 and 16. Resistor 16 is connected to ground at point 11. A parallel circuit comprising condenser 17 and resistor 18 is connected between point 19 and the ground 11 for the purpose of maintaining a uniform potential across the phototube 13 and to average out any fluctuation in potential as received from the positive terminal 10 through the various lines and connections. In other words the condenser 17 and resistor 18 act as a voltage regulator for the photoelectric circuit employing the phototube 13.

A first amplifying tube 20 is provided having an anode circuit 21, a cathode circuit 22, a control grid 23 and a screen grid 24. The control grid 23 is connected to the point 25 between resistor 16 and the phototube 13. The anode circuit 21 contains a load resistor 26 connected between the point 27 and the point 28.

The screen grid 24 is biased by the resistor 31 connected on the positive terminal at point 29 and grounded through condenser 33 at point 30. An adjustable contact point 32 is provided to vary the value of the resistor 31. It should be noted that there is no biasing resistor in the cathode circuit 22 and if the phototube is completely lighted and forgetting for the moment the bias on the screen grid 24, the tube 20 will conduct the maximum current possible although the tube may not be at, what is commonly called "saturation." However the resistor 31 and the adjustable contact point 32 can fix the maximum current which can be conducted by the tube 20. The larger the resistor 31 is, the less positive is driven the point 34 and the less positive point 34 becomes, the less maximum current tube 20 can conduct regardless of the positive potential imposed on the control grid 23.

Assume that the device is used for registration control in which the phototube 13 is inspecting registration marks darker in color than the white background of the paper. For a given light source and a given white background of paper, the phototube 13 normally receives a predetermined standard maximum amount of light and for this maximum amount of light the resistor 31 is either originally designed for such an amount of light or when the adjustable contact point 32 is used, the amount of resistance in the line between 34 and point 29 is adjusted to place such a bias on the screen grid 24 that tube 20 conducts a maximum amount of current approaching "saturation" when the tube 13 receives the predetermined standard amount of light from the white background of paper. Thus the biasing of the screen grid 24 will prevent any further increase of flow of current through the tube 20 if the phototube 13 should receive an amount of light greater than the predetermined standard for which the circuit was designed or adjusted. Therefore the tube 20 is responsive only to a decrease in the amount of light from the standard amount of light and is substantially unresponsive to an increase in the amount of light over and above the standard from which it is desired to indicate a change. However when the tube 13 receives a decrease in the amount of light from said standard, the point 25 becomes less positive in respect to the cathode 22 and the current flowing through the tube 20 decreases. In other words by such biasing of the screen grid, tube 20 is responsive to changes in potential below a predetermined maximum but is unresponsive to changes in potential above the predetermined maximum.

Throughout the specification and claims, whenever I speak of a positive or negative potential, or a positive or negative bias, I mean the relative potential or bias of the control grid with respect to its cathode. The cathode and grid may both be at a positive potential but if the grid is more positive than the cathode, a positive bias, pulse or potential is placed on the grid. Likewise both may have a positive potential but if the grid is less positive than the cathode a relative negative potential is placed on the grid.

The condenser 33 serves a function similar to the condenser 17 in maintaining a steady bias on the screen grid 24 independent of line fluctuations in voltage.

A second amplifying tube 35 is provided having an anode circuit 36, a cathode circuit 37, a control grid 38 and a screen grid 39. The control grid 38 is connected through the condenser 40 to the point 27 between resistor 26 and the anode 21. Thus the tubes 20 and 35 are connected 180° out of phase. By using condenser 40 a capacitance coupling is made between the loaded anode circuit 21 and the grid 38 such that only a pulse will be passed or in other words, the grid 38 receives only a pulse. When the control grid 23 receives a negative pulse, the control grid 38 receives a positive pulse. It should be noticed that whereas the tube 20 is biased in a direction approaching saturation, that tube 35 is biased in a direction where it is normally conducting little or no current and in all cases the tube 35 is biased so that it conducts less than half the "saturation" current. This is accomplished by means of the resistors 41 and 42. The resistor 41 is connected to the control grid 38 at point 43 and to the common ground line at point 44. The resistor 42 is connected to the cathode 37 and to the common ground line at point 45. The resistor 42 is of a relatively high value compared to the resistor 41 and therefore the normal bias of the tube is in the direction of "cut-off" rather than in the direction of "saturation" whereas the tube 20 is biased toward "saturation." The screen grid 39 is biased by the series circuit containing the resistor 46, the condenser 47 connected between point 48 and the ground 45. The screen grid is connected to point 49. The screen grid is biased in the normal manner for tube 35 and is not biased in the same manner that the screen grid 24 of the tube 20 is biased.

By having the tube 20 normally biased toward "saturation" and the tube 35 normally biased toward "cut-off" position, any slight positive charge in potential received by the grid 23 of the tube 20 will not pass through the circuit. Tube 20 by being biased toward "saturation" is substantially unresponsive to a positive charge on the control grid 23. Such slight positive charge that is passed through the condenser 40 to the grid 38 becomes negative at the control grid 38 and since the tube 35 approaches "cut-off" position, the negative charge has very little effect in decreasing the flow of current through the tube 35. However a relative negative pulse received by the grid 23 is highly amplified. A negative pulse received by the control grid 23 which occurs when the phototube 13 receives less light than the predetermined standard amount of light decreases the flow of current through tube 20. The decrease in the current through tube 20 passes a positive charge to the grid 38 and since the tube 35 is biased toward "cut-off" position, the tube 35 will conduct more current. Thus I have provided amplification of a relative negative pulse received by the grid 23 but the circuit is substantially unresponsive to a positive pulse.

A third amplifying tube 50 is provided having a cathode circuit 51, an anode circuit 52, a screen grid 53, which is biased in the normal manner, and a control grid 54. Although it is not necessary, it is usually preferred to have the normal bias of tube 50 approach "saturation" in order that it is responsive primarily to a negative pulse. The reason why it is not necessary to have it approach "saturation" is that the arrangement of tubes 20 and 35 in most cases take care of any situation where the control grid 23 receives a positive pulse. The control grid 54 is connected through the resistor 55 and condenser 56 to the point 57 in between the anode 36 and the load resistor 58. Therefore the control grid is connected through a capacitance coupling to the loaded anode circuit 36 such that the tubes 35 and 50 are 180° out of phase. A load resistor 59 is connected to the point 60 and to the point 61.

A fourth amplifying tube 62 is provided having a cathode circuit 63, an anode circuit 64, a control grid 65 and a screen grid 66. A resistor 67 is provided for biasing the screen grid 66 and is of such low value that the tube 62 is normally biased toward "saturation." It should also be noted that there is no biasing resistor in the cathode circuit 63. A resistor 68 relatively small in value is connected to the grid 65 at point 69 and to the common ground line at point 70.

Thus the tube 62 is biased substantially toward "saturation" so that it is substantially unresponsive to a positive pulse. The control grid 65 is capacitance coupled through the condenser 71 to the loaded anode circuit 52 at the point 61. When the control grid 54 of the tube 50 receives a negative pulse the condenser 71 charges positively since the two tubes 50 and 62 are 180° out of phase. However since the tube 62 is biased toward "saturation," it is substantially unresponsive to the positive charge received by the condenser 71. However when the condenser 71 discharges through the resistor 68 to the ground point 70, a negative potential is placed on the control grid 65 and since the tube 62 is biased toward "saturation," it is responsive to the negative pulse. The condenser 71 cannot discharge through the control grid 65 through the cathode 63 to ground because of the bias of the tube 62 and therefore the positive charge builds up in the condenser 71 to a point controlled by the size of the resistor 68 and then the condenser 71 discharges to the ground through the point 70. Upon such discharge, a negative pulse is placed on the control grid 65 and the current in the tube 62 is decreased. Thus although tubes 50 and 62 are connected 180° out of phase, they are both responsive only to a negative pulse and respond in phase for a decrease in current as caused by the negative pulses received by the respective control grids 65 and 54. I have found that I get a sharper response in the decrease in the flow of current in tube 62 if the condenser 71 is relatively small since the condenser 71 rapidly receives a positive charge and then sharply discharges through the resistor 68. In other words the arrangement of the tubes 50 and 62 distort the pulse received by the tube 20 in the sense that the pulse in going from plus to minus is a point or peak rather than the usual change corresponding to the sine curve where the two tubes are truly 180° out of phase. This causes the entire amplification system in effect to have the phototube work off the darkest point of the indicia mark employed in registration control which the phototube 13 is inspecting during registration control. This circuit is therefore much more sensitive than any circuit heretofore designed for this purpose.

A fifth amplifying tube 72 is provided having a cathode 73 and an anode 74. The tube 72 has a control grid 75 which is connected through the condenser 76 to the loaded anode circuit 52 of the tube 50 at point 61. The control grid is also connected through a resistor 77 to a negative source of potential at point 78 which is lower in negative potential than either the points 11 or 12. The tube 72 therefore is normally biased substantially at "cut-off" position. In other words, the point 78 is sufficiently negative that little or no current flows through the tube 72 when there is no positive potential placed on the control grid 75. The tubes 51 and 72 are truly connected 180° out of phase. The arrangement of the tubes 72 with the tube 50 serves as an automatic volume control to average out the strength of a plurality of negative pulses received by the control grid 54 of the tube 50. The cathode 73 of the tube 72 is connected through the condenser 79 to the ground 12. The control grid 54 of the tube 50 is connected through the resistor 55 to the point 80 through the resistor 81 and to the point between the condenser 79 and the cathode 73 of the tube 72. When the control grid 54 receives a negative pulse the control grid 75 receives a positive pulse which causes current to pass through the tube 72 and a positive charge is placed by the condenser 79 at the point 82. The only way the condenser can discharge is through the resistor 81, the resistor 55, the control grid 54, the cathode 51 to the ground 12. Thus a positive charge is also placed at the point 80 which is opposite to the charge received by the control grid 54. The resistor 81 is larger than the resistor 55 so that only a portion of the charge received by the control grid 54 is neutralized by the positive charge received at the point 80. For registration control in which 500 to 1000 pulses per minute are received by the phototube 13, the resistor 81 is ten times larger in value than the resistor 55. Therefore where a series of pulses are received by the phototube 13, and transmitted to the tube 40, they are averaged out by means of the automatic volume control above described so that the strength of the pulse received by the control grid 54 is substantially the same regardless of variations in the strength of the pulse received by the control grid 23. The automatic volume control is important particularly in registration control where the light source may vary somewhat and where the color of the registration mark also varies. But most important it takes care of variations in the light reflection qualities in the background of the paper being printed.

A sixth amplifying tube 89, preferably of the gas-filled arc discharge type is provided. The amplifying tube 89 has an anode circuit 90, a control grid 85 and a cathode circuit 86. The tube 89 is connected to an independent source of direct current potential having its positive terminal at 87 and grounded at 88. The control grid 85 is connected to the loaded anode circuit 64 having the load resistor 83. The control grid is connected between the anode 64 of the tube 62 and the load resistor 83 at point 84. Therefore the tubes 62 and 89 are 180° out of phase. When the control grid 65 receives its negative charge upon the discharge of condenser 71, the control grid 85 receives a positive charge and causes the tube 89 to conduct a current. In this particular illustration the tube 89 has a relay coil 91 in its anode circuit 90 which closes the relay switch 92 when the tube 89 conducts a current. The relay switch 92 may operate any suitable indicating means or may actuate a motor or control device according to the type of operation being conducted. The relay switch 92 or any other suitable indicating means is therefore responsive when the control grid 23 receives a relative negative charge of potential which is the case when the phototube 13 receives less light than the predetermined standard amount of light and is unresponsive when the phototube 13 receives light greater than the predetermined standard amount of light. A bias rectifier 93 is provided to normally maintain a negative bias on the tube 89.

Figure 2 is a modification of the photoelectric circuit employing the tube 13. The entire circuit from the tube 20 on is identical for Figures 1 and 2 and therefore the entire circuit is not shown in Figure 2. The only difference between Figure 1 and 2 is that the position of the resistor 16 and phototube 13 is reversed. The control grid 23 is still responsive only to a negative pulse of potential. However such negative pulse of potential is caused in the case of Figure 2 by the phototube 13 receiving an increase in light above a predetermined standard rather than a decrease in light below a predetermined standard as is the case for Figure 1. In Figure 2 when the phototube 13 receives an increase in light above a predetermined standard, it places a negative pulse on the grid 23. However if the tube 13 receives light less than the predetermined standard, the entire system is unresponsive to the resulting positive charge received by the control grid 23 and in exactly the same manner as has been herein described for Figure 1.

I claim as my invention:

1. A photoelectric amplifying circuit responsive to a change of light only in one direction from a predetermined standard amount of light comprising a source of direct current; an amplifying tube connected to said source; said amplifying tube having a cathode circuit, an anode circuit a screen grid and a control grid, said control grid biased by a light sensitive circuit comprising a photoelectric device; independent voltage applying means connected to said screen grid for biasing said amplifying tube such that when said device receives a predetermined standard amount of light said amplifying tube is conducting the maximum current possible such that any change of light in one direction from said predetermined standard causes substantially no increase in current through said amplifying tube and such that any change in the amount of light opposite to the above mentioned change from said predetermined standard causes a decrease in the flow of current through said amplifying tube.

2. In an amplifying circuit a source of direct current, a first amplifying tube connected to said source, said amplifying tube having a loaded anode circuit, a cathode circuit and a control grid, means for biasing said amplifying tube such that a negative pulse applied to the control grid decreases the flow of current through the amplifying tube, means for applying a negative pulse to said grid, a first resistor in series between said last mentioned means and said grid, a second amplifying tube having an anode circuit, a cathode circuit and a control grid, said last mentioned control grid connected to said loaded anode circuit such that said amplifying tubes are 180° out of phase, a condenser in the cathode circuit of said second amplifying tube, a second resistor connected at one end between said condenser and the cathode of said second tube and connected at the other end between said first resistor and said means for applying a negative pulse, said second resistor larger in capacity than said first resistor so as to average out the strength of said negative pulse received by the first amplifying tube.

3. An amplifying circuit comprising a first amplifying tube having a loaded anode circuit, a cathode circuit, a control grid and a screen grid, a source of direct current potential, said amplifying tube connected to said source, said screen grid connected through a resistor to the positive terminal of said source, a photoelectric circuit comprising a phototube and a resistor connected in series across said source of current, the anode of said phototube connected to the positive side of said source and the cathode connected to said resistor in said series circuit, said control grid connected between said photocell and said resistor in said series circuit such that decreases in the amount of light received by the photocells causes a negative potential to be placed on said control grid, the value of said first mentioned resistor fixed such that for a predetermined amount of light received by the photocell the amplifying tube is conducting the maximum current possible irrespective of how high a positive potential should be placed on the control grid, and such that any increase in the amount of light received by said phototube above said predetermined standard amount of light causes no substantial increase in the flow of current through said amplifying tube; a second amplifying tube having an anode circuit, a cathode circuit and a control grid, said control grid capacitance coupled to the loaded anode circuit of said first amplifying tube such that the two tubes are 180° out of phase and such that the second amplifying tube receives only a positive pulse, a resistance means in the cathode circuit of said second amplifying tube for biasing said tube such that it is substantially unresponsive to any negative pulse received by the control grid of the second amplifying tube and such that it is substantially responsive to a positive pulse received by the control grid of the second amplifying tube.

4. An amplifying circuit comprising a first amplifying tube having a loaded anode circuit, a cathode circuit, a control grid and a screen grid, a source of direct current potential, said amplifying tube connected to said source, said screen grid connected through a resistor to the positive terminal of said source, a photoelectric circuit comprising a phototube and a resistor connected in series across said source of current, the anode of said phototube connected to the positive side of said source and the cathode connected to said resitor in said series circuit, said control grid connected between said photocell and said resistor in said series circuit such that decreases in the amount of light received by the photocells causes a negative potential to be placed on said control grid, the value of said first mentioned resistor fixed such that for a predetermined amount of light received by the photocell the amplifying tube is conducting the maximum current possible irrespective of how high a positive potential should be placed on the control grid, and such that any increase in the amount of light received by said phototube above said predetermined standard amount of light causes no substantial increase in the flow of current through said amplifying tube; a second amplifying tube having a loaded anode circuit, a cathode circuit and a control grid, said control grid capacitance coupled to the loaded anode circuit of said first amplifying tube such that the two tubes are 180° out of phase and such that the second amplifying tube receives only a positive pulse, a resistance means in the cathode circuit of said second amplifying tube for biasing said tube such that it is substantially unresponsive to any negative pulse received by the control grid of the second amplifying tube and such that it is substantially responsive to a positive pulse received by the control grid of the second amplifying tube; a third amplifying tube having an anode circuit, a cathode circuit and a control grid, said third amplifying tube capacitance coupled to the loaded circuit of the second amplifying tube such that the second and third amplifying tubes are 180° out of phase and such that the third amplifying tube receives only a negative pulse; a fourth amplifying tube having a loaded anode circuit, a cathode circuit and a control grid, said control grid connected through a condenser to the loaded anode circuit of the third amplifying tube such that said third and fourth tubes would normally operate 180° out of phase; means for preventing the third and fourth tubes operating 180° out of phase including means for causing said tubes to operate in phase for decreasing amounts of current simultaneously flowing through each of said tubes comprising independent means for biasing said amplifying tube toward saturation, said fourth amplifying tube thereby being substantially unresponsive to a positive pulse received by the control grid of the fourth amplifying tube from the charge on said condenser in said capacitance coupling between the loaded anode circuit of said third amplifying tube and said control grid of the fourth amplifying tube but being substantially responsive to a negative pulse on said control grid of said amplifying tube when said condenser discharges to ground.

5. An amplifying circuit comprising a first amplifying tube having a loaded anode circuit, a cathode circuit, a control grid and a screen grid, a source of direct current potential, said amplifying tube connected to said source, said screen grid connected through a resistor to the positive terminal of said source, a photoelectric circuit comprising a phototube and a resistor connected in series across said source of current, the anode of said phototube connected to the positive side of said source and the cathode connected to said resistor in said series circuit, said control grid connected between said photocell and said resistor in said series circuit such that decreases in the amount of light received by the phototube causes a negative potential to be placed on said control grid, the value of said first mentioned resistor fixed such that for a predetermined amount of light received by the photocell the amplifying tube is conducting the maximum current possible irrespective of how high a positive potential should be placed on the control grid, and such that any increase in the amount of light received by said phototube above said predetermined standard amount of light causes no substantial increase in the flow of current through said amplifying tube; a second amplifying tube having a loaded anode circuit, a cathode circuit and a control grid, said control grid capacitance coupled to the loaded anode circuit of said first amplifying tube such that the two tubes are 180° out of phase and such that the second amplifying tube receives only a positive pulse, a resistance means in the cathode circuit of said second amplifying tube for biasing said tube such that it is substantially unresponsive to any negative pulse received by the control grid of the second amplifying tube and such that it is substantially responsive to a positive pulse received by the control grid of the second amplifying tube; a third amplifying tube having an anode circuit, a cathode circuit and a control grid, said third amplifying tube capacitance coupled to the loaded circuit of second amplifying tube such that the second and third amplifying tubes are 180° out of phase and such that the third amplifying tube receives only a negative pulse; a fourth amplifying tube having a loaded anode circuit, a cathode circuit and a control grid, said control grid connected through a condenser to the loaded anode circuit of the third amplifying tube such that said third and fourth tubes would normally operate 180° out of phase; means for preventing the third and fourth tubes operating 180° out of phase including means for causing said tubes to operate in phase for decreasing amounts of current simultaneously flowing through each of said tubes comprising independent means for biasing said amplifying tube toward saturation, said fourth amplifying tube thereby being substantially unresponsive to a positive pulse received by the control grid of the fourth amplifying tube from the charge on said condenser in said capacitance coupling between the loaded anode circuit of said third amplifying tube and said control grid of the fourth amplifying tube but being substantially responsive to a negative pulse on said control grid of said amplifying tube when said condenser discharges to ground; a fifth amplifying tube of the gas-filled arc-discharge type comprising an anode circuit, a cathode circuit and a control grid, said control grid connected to the loaded anode circuit of said fourth amplifying tube such that the fourth and fifth tubes are 180° out of phase; and means in the anode circuit of said fifth tube for indicating a decrease in light received by said phototube below said predetermined standard amount of light.

6. An amplifying circuit comprising a source of direct current, an amplifying tube connected to said source comprising an anode circuit, a cathode circuit, a control grid and a screen grid, a first voltage applying means connected with and biasing said control grid, a second voltage applying means connected with and biasing said screen grid such that an increase in positive potential on the control grid above a predetermined positive potential causes substantially no increase in the flow of current through said amplifying tube, and independent voltage supplying means for driving the potential on said control grid in a negative direction thereby reducing the flow of current through said tube.

SAMUEL C. HURLEY, JR.

REFERENCES CITED

The following references are of record in the file of this patent:

UNITED STATES PATENTS

| Number | Name | Date |
|---|---|---|
| 1,971,823 | Long | Aug. 28, 1934 |
| 2,178,304 | Holness | Oct. 31, 1939 |
| 2,249,820 | Gulliksen | July 22, 1941 |
| 2,252,457 | Cockrell | Aug. 12, 1941 |
| 2,423,671 | Wolff | July 8, 1947 |

OTHER REFERENCES

Principles of Radar, by M. I. T. Radar School Staff, second edition, published by McGraw-Hill Book Co., pp. 2-27 to 2-30 inclusive.